United States Patent [19]
Nobusawa

[11] 3,969,735
[45] July 13, 1976

[54] CAMERA WITH AUTOMATIC EXPOSURE-DETERMINING STRUCTURE

[75] Inventor: Tsukumo Nobusawa, Tokyo, Japan

[73] Assignee: Asahi Kogaku Kogyo Kabushiki Kaisha, Japan

[22] Filed: Mar. 4, 1975

[21] Appl. No.: 555,298

[30] Foreign Application Priority Data
Mar. 11, 1974 Japan................................ 49-27921
Apr. 24, 1974 Japan................................ 49-46237

[52] U.S. Cl.............................. 354/29; 354/23 D; 354/43; 354/50; 354/60 L; 354/268
[51] Int. Cl.² ........................................ G03B 7/14
[58] Field of Search ............ 354/23 D, 26, 268, 50, 354/51, 29, 30, 43, 44, 60 E, 60 L

[56] References Cited
UNITED STATES PATENTS
3,813,680   5/1974   Wagensonner et al. .......... 354/23 D
3,827,065   7/1974   Wada................................ 354/23 D

*Primary Examiner*—L. T. Hix
*Assistant Examiner*—James LaBarre
*Attorney, Agent, or Firm*—Steinberg & Blake

[57] ABSTRACT

A camera which has the capability of automatically determining exposure of film. A light-responsive structure of the camera produces a number of pulses which is inversely proportional to light brightness while a reference pulse generating structure is capable of producing a series of reference pulses. A binary counter is connected through a switch structure to both the light-responsive structure and the reference pulse generating structure, with the switch structure first connecting the light-responsive structure to the binary counter so that the latter counts the number of pulses which is inversely proportional to light brightness. Thereafter an inverting structure which is connected to the binary counter inverts the number of pulses counted thereby, and then the switch structure disconnects the light-responsive structure from the binary counter and instead connects the reference pulse generating structure thereto so that the binary counter then counts reference pulses. The shutter is opened simultaneously with the connection of the reference pulse generating structure to the binary counter, and an automatic exposure-terminating structure detects when the number of reference pulses counted by the binary counter equals the number of pulses which were counted by the binary counter when it was connected by the switch structure to the light-responsive structure. Upon detecting this equality the exposure-terminating structure causes the shutter to be closed so that the exposure is terminated. In this way automatic exposure is capable of being determined by a digital counting structure rather than by a memory capacitor, for example.

The camera further includes a blocking circuit for preventing the opening of the shutter when the number of pulses received by the counter from the light responsive structure is beyond one end of a given range and a digital diaphragm control circuit for adjusting the diaphragm when such a condition occurs.

11 Claims, 14 Drawing Figures

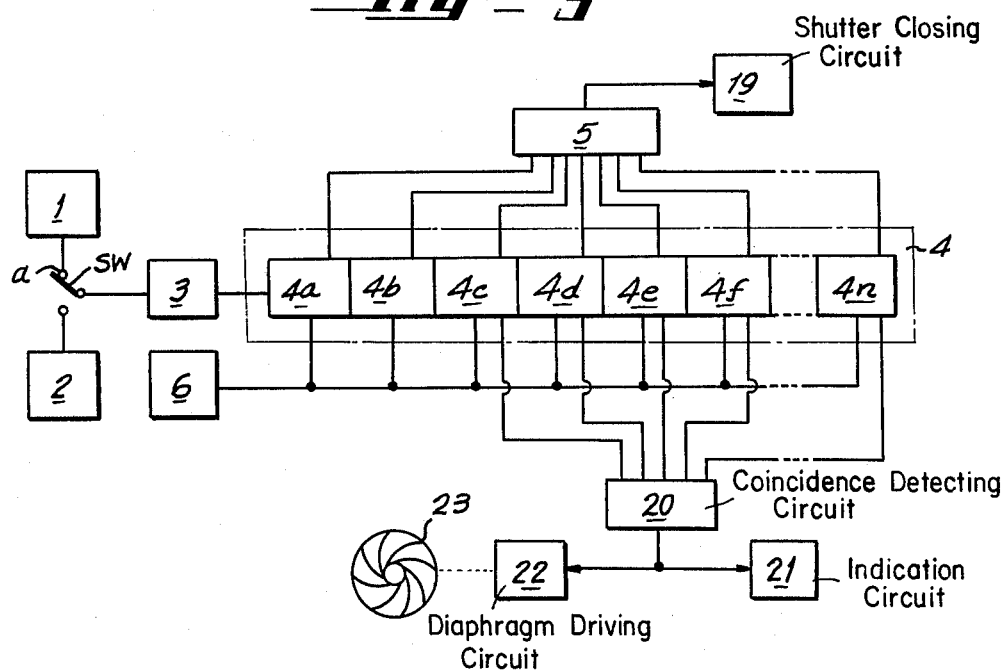
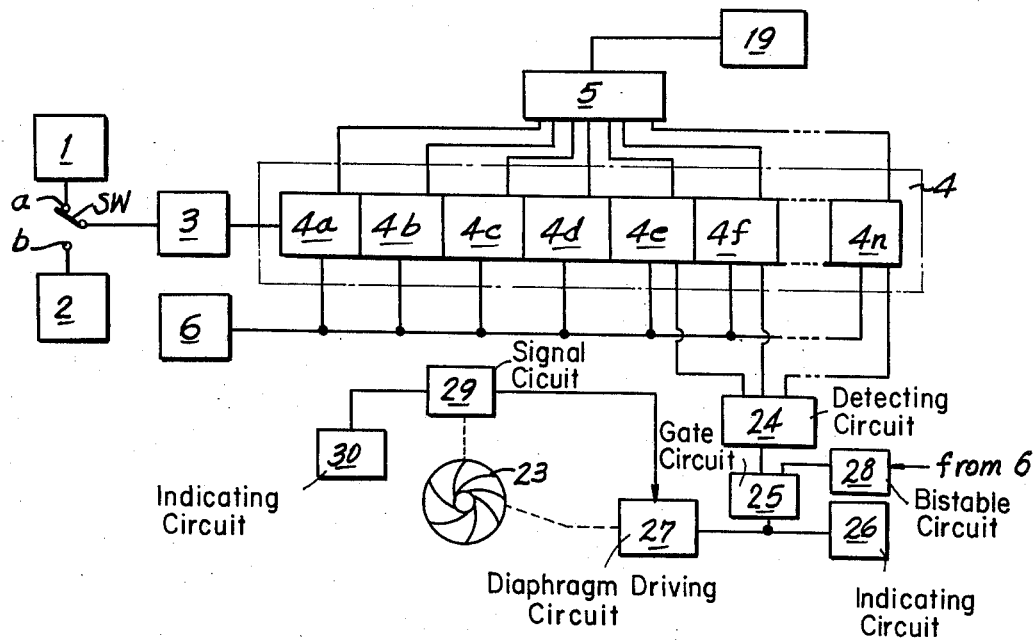

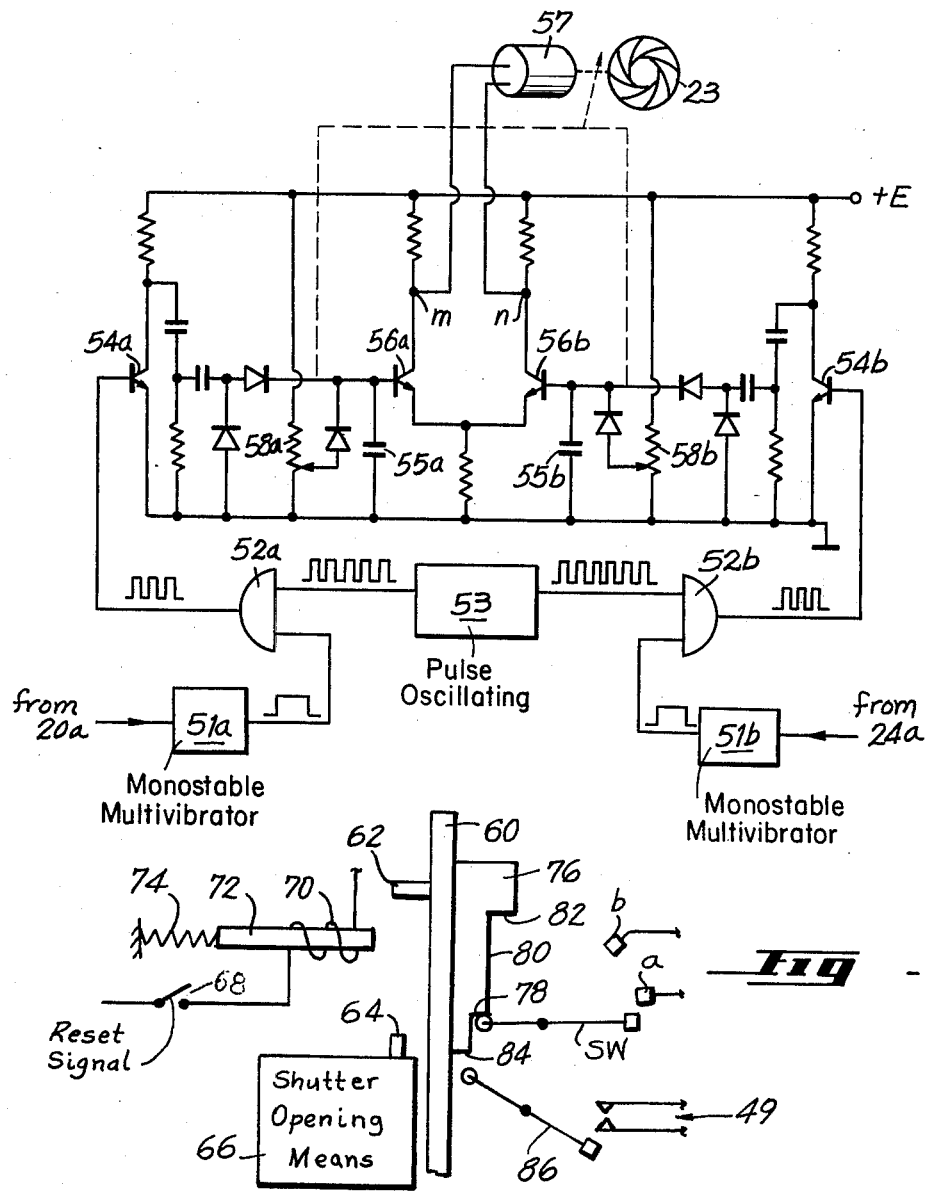

CAMERA WITH AUTOMATIC EXPOSURE-DETERMINING STRUCTURE

BACKGROUND OF THE INVENTION

The present invention relates to cameras.

In particular, the present invention relates to cameras which are capable of automatically determining the exposure of film therein.

In particular, the present invention relates to that type of camera which is capable of receiving light internally to be measured with the light brightness being memorized prior to opening of the shutter.

Thus, as is well known, with many single lens reflex cameras the light travels along the optical axis of the objective to be reflected by a mirror in the camera up to the viewfinder where the light is measured while the operator can simultaneously view the object which is to be photographed, and of course at this time the mirror prevents the light from reaching the film plane. In order to make an exposure it is necessary to tilt the mirror away from the optical axis so that the light can continue to travel along the optical axis past the location of the mirror to the film plane, and in this way upon opening of the shutter the film will be exposed. As a result of the requirements of this type of structure it is necessary to memorize in some way the brightness of the light at the object which is to be photographed so that this one of the factors which controls exposure of film can be utilized during exposure.

It is widely known to use a memory capacitor for such purposes. With such memory capacitor devices, however, it is difficult to provide a circuit which will apply the capacitor-memorized information to a switching circuit for control of the shutter, and errors frequently occur.

SUMMARY OF THE INVENTION

It is accordingly a primary object of the present invention to provide an extremely accurate determination of film exposure according to which the memorizing of the brightness of the light at the object which is to be photographed and the operation of the shutter, in particular, the exposure time, are carried out with digital signals.

A further object of the present invention is to provide an automatic exposure-determining structure of the above type which is capable of preventing an exposure from being made when the photographing conditions are such that an improper photograph will be made. Thus, for example, it is an object of the invention to provide a camera which is capable of preventing exposure of the film in the event that the brightness of the light is so great that with the particular setting of the diaphragm and the smallest exposure time which the camera can produce there would still be an over exposure. Also it is an object of the present invention to provide for a camera of the above type the capability of preventing film from being exposed in the case where the brightness of the light is so small that with the exposure time which would automatically be provided the resulting exposure time would be so long that shaking of the camera while it is hand-held is likely to occur during exposure so as to create undesirable blurring of the image which is recorded on the film.

Yet another object of the present invention is to provide a camera of the above general type which, when the photographing conditions are such that a proper photograph cannot be made as set forth above, instead of absolutely preventing a photograph from being made will automatically adjust the diaphragm to a different setting which will compensate for the particular photographing conditions so that immediately after one attempt is made to expose the film with lighting conditions which would result in an improper exposure the diaphragm is automatically adjusted so that the exposure can then be made with a diaphragm adjusted to enable a proper exposure to be made.

It is also an object of the present invention to provide a camera of the above general type which makes it possible for a particular photographer to adjust the camera to his own particular operating capabilities in connection with extreme photographing conditions.

Also, it is an object of the present invention to provide a camera which can simply indicate to the operator when a condition such as extremely low light is present, so that the operator can then place the camera on a tripod, for example, thus enabling a proper photograph to be made without holding the camera by hand.

According to the invention the operation is such that a light-responsive means is capable of generating a number of pulses which is inversely proportional to the brightness of the light at the object to be photographed, and the number of pulses thus generated are memorized as a binary number by a binary counter. This binary counter has a number of bit-stages each of which has an output of either 1 or 0, and after the number of pulses which is inversely proportional to light brightness is counted, this binary number is inverted. Thereafter, in synchronism with opening of the shutter a reference pulse generating means generates reference pulses of a constant period and these are applied to the binary counter by way of a switch means which previously connected the light-responsive pulse generating means to the binary counter. Thus, after the initial number of pulses inversely proportional to light brightness has been inverted, the binary counter counts the reference pulses. An exposure-terminating means is connected to the binary counter for detecting when the number of reference pulses counted by the binary counter is equal to the number of pulses memorized prior to inversion, and upon making the detection of this equality the exposure-terminating means brings about closing of the shutter so as to terminate the exposure.

Thus, the number of pulses provided by the light-responsive pulse generating means is applied to the binary counter as an input and is inversely proportional to the brightness of the light at the object which is to be photographed. However, in addition an over exposure limit value and/or a blur limit value resulting from unsteadiness of a hand-held camera are established. Then the structure is set in such a way that the shutter is prevented from being opened when the number of pulses produced by the light-responsive pulse generating means and applied to the binary counter is smaller than the over exposure limit value or greater than the predetermined blur limit value when the camera is hand-held.

In addition to simply preventing the shutter from being opened under these conditions, the structure of the invention is capable of automatically adjusting a diaphragm of the camera so that it is stopped down by a certain value when the number of pulses counted by the binary counter and received from the light-responsive pulse generating means is smaller than a predetermined over exposure limiting value, while the diaphragm is automatically opened by a certain increment when the number of pulses counted by the binary counter and received from the light-responsive pulse-generating means is greater than the limiting blur value for a hand-held camera. Thus, with automatic adjusting of the diaphragm in this way it is immediately possible for the operator to carry out an exposure of the film with photographing conditions which will provide a proper exposure where over exposure or blurring will not occur.

BRIEF DESCRIPTION OF DRAWINGS

The invention is illustrated by way of example in the accompanying drawings whcih form part of this application and in which:

FIG. 5 also illustrates a structure similar to FIG. 3 but shows in greater detail the features according to which in addition to preventing exposure under improper photographing conditions automatic resetting of a diaphragm takes place;

FIG. 6 diagrammatically illustrates a construction which also will prevent improper exposures and automatically adjust the diaphragm with FIG. 6 showing schematically limitations on the extent to which the diaphragm will be adjusted;

FIG. 13 illustrates one example of circuitry for automatically adjusting the diaphragm; and FIG. 14 is a schematic representation of various structures which are operated in response to depression of the shutter-tripping plunger as well as structure for preventing the plunger from being depressed sufficiently to trip the shutter when the structure of the invention detects that a proper exposure cannot be made.

DESCRIPTION OF PREFERRED EMBODIMENTS

Figure 1:
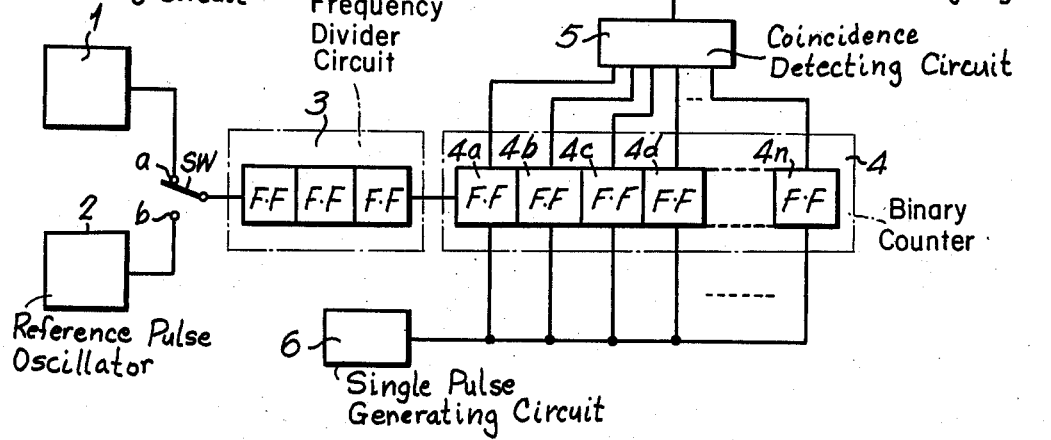
FIG. 1 is a schematic diagram illustrating the basic structure of the present invention as it relates to use of digital pulses and a binary counter to memorize information such as light brightness.

FIG. 1 illustrates one embodiment of the invention utilizing a binary counter means. FIG. 1 shows at the upper left a light-responsive pulse-generating means 1 which receives light from the object to be photographed after the light has travelled through the objective of the camera and which in response to the brightness of this light generates pulses the number of which is inversely proportional to the light brightness. The circuit 1 is made up, for example, of a photoelectric timer circuit and a pulse oscillator and functions in such a way that greater degrees of brightness provide a lesser number of pulses than lesser degrees of brightness.

A reference pulse generating means 2 is provided, as shown at the lower left portion of FIG. 1, in order to generate reference pulses of a constant period, this pulse-generating means being in the form of a suitable pulse oscillator. The two pulse generating means 1 and 2 are arranged in such a way that the pulses therefrom are transmitted to a binary counter means, described below, through a selective change-over switch means SW. If necessary, a frequency divider circuit 3 is provided. Thus, this frequency divider circuit 3 is connected directly to the switch SW between the latter and the binary counter means 4. In the illustrated example flip-flop circuits (hereinafter referred to as F.F.) are utilized for the frequency divider circuit. In order that the computation will make allowance for exposure factors in addition to light brightness such as, for example, the factor of film sensitivity, it is possible to vary the frequency dividing ratio of the frequency divider circuit, so that through such an expedient the final results, or in other words, the finally determined exposure time, will be calculated taking into consideration a factor such as the speed of the film which is exposed. However, it is also possible to include in the computations such additional exposure factors as film speed by way of varying the frequency of the light-responsive pulse generating means 1 and the reference pulse generating means 2.

The binary counter means is made up, for example, of F.F.'s connected together in a well known manner. The number of bit-stages of the binary counter means may be determined in accordance with the range of exposure time which is desired for the camera.

An exposure-terminating means 5 takes the form of a coincidence detecting circuit which will produce a shutter closing signal when each bit stage of the binary counter means 4 produces the same output. For example, if an output 0 is produced from each of the bit-stages 4a, 4b . . . , 4n when the binary counter means 4 is in its reset state, then the coincidence detecting circuit 5 may be constructed as an AND circuit so that a shutter closing signal is produced when an output 1 is produced from each of the bit-stages 4a, 4b . . . 4n. Alternatively, however, if an output 1 is produced from each bit stage in the reset state of the binary counter means, then the coincidence detecting circuit 5 may be constructed as a NOR circuit so that a shutter closing signal will be produced when the output of each bit-stage is 0.

The coincidence detecting circuit 5 which forms the exposure-terminating means may take the form of any circuit whose output changes in response to coincidence or non-coincidence of the inputs. In addition, the actuating input and the shutter closing signal output may be either 1 or 0. Thus, it is clear that for the coincidence detecting circuit 5 in addition to the above-mentioned logic circuits, it is also possible to utilize a NAND circuit, an OR circuit, an exclusive OR circuit, etc.

As a result of counting of pulses from the light-responsive pulse generating means 1, the binary counter means 4 will memorize at each of the bit-stages 4a, 4b, 4c, . . . 4n a binary digit (0 or 1).

In addition to the above structure it will be noted that FIG. 1 includes a single pulse generating circuit 6 which forms an inverting means for inverting the output binary digit memorized by the several bit-stages of the binary counter means 4.

The above-described structure of FIG. 1 operates as follows:

It is assumed that the structure of FIG. 1 is included in a single lens reflex camera where the input to the binary counter means 4 from the light-responsive pulse generating means 1 is provided prior to swinging up of the mirror in connection with making an exposure. For example, the transmission of pulses from the light-responsive pulses generating means 1 to the binary counter means 4 takes place during the initial part of the downward movement of the shutter-tripping plunger of the camera. Thus, during this initial phase of the movement of the shutter-tripping plunger the pulse generating means 1 operates so as to produce a number of pulses which is inversely proportional to the brightness of the light at the object which is to be photographed. These pulses are applied to the binary counter means 4 through the switch SW which at this time is in the position shown in FIG. 1 engaging the contact $a$ which is connected to the pulse-generating means 1. Thus, the pulses produced by the latter are transmitted to the binary counter means 4 through the frequency divider circuit 3. It is assumed that in the normal reset state of the binary counter means 4, the output of each of the bit-stages thereof is 0, so that no output is produced from the coincidence detecting circuit 5 which is assumed to consist of an AND circuit. Thus, the binary counter means 4 counts the number of the pulses received from the light-responsive pulse generating means 1 and counts the number of thus-applied pulses so that the outputs of the bit-stages of the binary counter means 4 vary in a binary manner.

Upon completion of the above counting of the pulses provided by the pulse-generating means 1, for example during a second intermediate stage of movement of the shutter-release plunger, the single pulse generating circuit 6 operates in such a way that its output inverts the output of each of the bit-stages of the binary counter means 4, so that this single pulse-generating circuit 6 operates as an inverting means.

Then, for example during the third and last phase of movement of the shutter-tripping plunger, just prior to tripping of the shutter, the change-over switch SW is moved so as to become displaced away from the contact $a$ and instead to engage the contact $b$, so that simultaneously with opening of the shutter the reference pulse generating means 2 is connected by the switch means SW to the binary counter means 4 just after disconnecting the light-responsive pulse generating means 1 from the binary counter means 4. Thus, the shutter opens and exposure starts simultaneously with the counting of reference pulses of a constant period by the binary counter means 4, these reference pulses of course being generated by a reference pulse oscillator which forms the reference pulse generating means 2. Thus, these additional pulses from the pulse generating means 2 are now applied to the binary counter 4 through the switch SW and the frequency divider circuit 3. The binary counter 4 which is now in its inverted state counts these additional pulses until an output 1 is produced from each of the bit-stages 4a, 4b, . . . 4n, and when this same output is provided at each of the bit-stages a shutter-closing signal is produced from the coincidence detecting circuit 5 which detects when all of the bit-stages have the same output. Thus, the exposure-terminating means 5 detects when all of the outputs from the several bit-stages are the same, and in response to detecting this condition the shutter-closing signal is provided in order to close the shutter and terminate the exposure.

With the above structure of the invention the number of reference pulses applied to the binary counter 4 as additional pulses from the reference pulse generating means 2 will equal the number of pulses applied and memorized by the binary counter means 4 when the latter was connected by the switch means SW to the light-responsive generating means 1, so that the exposure-terminating means 5 detects when the number of pulses from the generating means 2 equals the number of pulses previously received from generating means 1 and upon detecting this equality the exposure-terminating means 5 produces the exposure-terminating signal. The number of the memorized pulses is of course inversely proportional to the brightness of the light at the object to be photographed, so that a shutter time is determined in accordance with the light brightness at the object to be photographed. This operation is described in greater detail below:

For the sake of simplicity, let it be assumed that $n = 4$ in the binary counter means 4, which is to say let it be assumed that the binary counter means 4 has four bit-stages. If, for example, three pulses (the pulses derived from the frequency divider circuit 3) are applied to the binary counter means 4 to be memorized thereby, then the number of these pulses is 0011 in binary notation (1 for the bit-stages 4a and 4b and 0 for the bit-stages 4c and 4d). This number will be inverted into 1100 (0 for the bit-stages 4a and 4b and 1 for the bit-stages 4c and 4d). Then when the additional pulses are provided from the reference pulse generating means 2, then the first three additional input pulses received by the binary counter means 4 from the generating means 1 will provide a binary number 1111, so that the coincidence detecting circuit which consists of an AND circuit will respond and produce a shutter closing signal. This signal will, for example, cause a switching device to operate and close the shutter. In this way the exposure time is determined in accordance with the brightness of the light at the object to be photographed.

Figure 2:
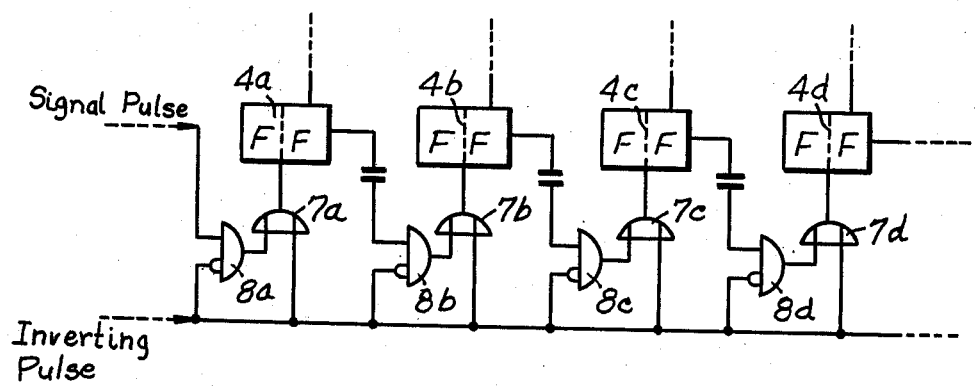
FIG. 2 is a schematic representation at an enlarged scale of the manner in which the number counted by the binary counter is inverted.

FIG. 2 illustrates one example of the circuitry of an inverting means for inverting the output of each bit-stage of the binary counter means 4. In FIG. 2 there are a plurality of OR circuits 7a, 7b, 7c, and 7d as well as a plurality of inhibiting circuits 8a, 8b, 8c and 8d. The arrangement is such that input signal pulses to the bit-stages 4a, 4b, 4c and 4d of the binary counter means 4 are applied through these inhibiting circuits and OR circuits, and inverting pulses are applied to the NOT terminals of the inhibiting circuits and to the OR circuits.

When the pulses are first memorized there are no inverting pulses so that the inhibiting circuits 8a, 8b, 8c and 8d have no inhibiting action. Therefore the signal pulses from the light-responsive pulse generating means 1 (not illustrated in FIG. 2) are applied to the bit-stage 4a through the inhibiting circuit 8a and the OR circuit 7a. The signal pulse from the bit-stage 4a is applied to the bit-stage 4b through the inhibiting circuit 8b and the OR circuit 7b. Thus, during the memorizing action, the several bit-stages 4a, 4b, 4c and 4d count in a binary manner the received signal pulses which have been produced in response to brightness of the light at the object to be photographed.

After this counting operation has been completed, an inverting pulse, in the form of a single pulse, is applied for inverting the output of each bit-stage. This inverting pulse is applied to each of the bit-stages 4a, 4b, 4c and 4d through the OR circuits 7a, 7b, 7c and 7d respectively, so that the several outputs of the several bit-stages are simultaneously inverted. This will bring about inversion of the output of each bit-stage. However, with the circuitry shown in FIG. 2, the inversion output of one bit-stage is not transmitted to the next bit-stage since it is blocked by each inhibiting circuit with the inversion pulse being applied to the NOT terminal of each inhibiting circuit. For example, when as a result of the application of the inverting pulse the output of the bit-stage 4a is inverted, this inverting pulse is applied to the NOT terminal of the inhibiting circuit 8b, so that the inversion output cannot pass through the inhibiting circuit 8b. Accordingly, there is no possibility of again inverting the previously inverted output of the bit-stage 4b. Thus, the inhibiting circuits act as switch devices for preventing repeated inversions. Therefore, for the inverting operation instead of utilizing inhibiting circuits it is possible to utilize also switches capable of disconnecting the several bit-stages from each other, or other well-known inverting means which will not cause the inversion to be transmitted from one bit-stage to the next bit-stage.

Figure 3:
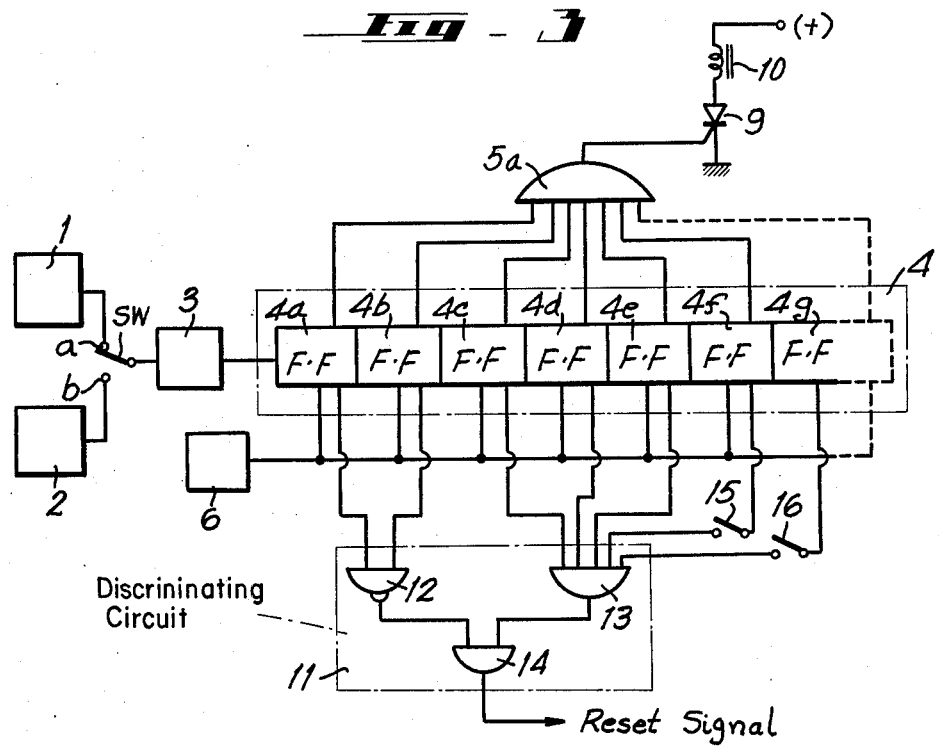
FIG. 3 shows the circuit of FIG. 1 with additional details and in particular with a structure which is capable of bringing about a prevention of exposure under improper photographing conditions.

FIG. 3 illustrates an embodiment of the invention which includes not only the above-described structure of FIG. 1 but which in addition includes structure capable of preventing an exposure from being made when the photographing light is not suitable for a photograph as, for example, when the brightness of the light at the object to be photographed is so great that even when making an exposure with the smallest possible exposure time that the camera can produce there would nevertheless be an over exposure, or for the case where the amount of light at the object to be photographed is so low that with a hand-held camera blurring of the photographed image would occur. In other words, the embodiment of FIG. 3 enables exposures to be made only when the photographing conditions are suitable for achieving good exposures. It will be noted that the embodiment of FIG. 3 includes an AND circuit 5a which forms the exposure-terminating means, acting as a coincidence detecting circuit and being connected to an SCR 9 for rendering the latter conductive when the means 5a produces an output so as to excite in this way an electromagnet 10 which when energized will bring about closing of the shutter in a known way.

The embodiment of FIG. 3 includes a means which will prevent a shutter-opening means from operating when the photographing conditions are such that a proper exposure will not be made, and this means for preventing opening of the shutter under these conditions includes the discriminating circuit 11 shown at the lower part of FIG. 3, the circuit 11 being capable of discriminating whether a photographing light intensity suitable for a good photograph is provided or not. The circuit 11 compares the outputs of the bit-stages 4a and 4b with the outputs of the bit-stages 4c, 4d, and 4e, and in response to this comparison the circuit 11 will, for example, produce a reset signal which will reset the binary counter to its initial state and which will in addition bring about a prevention of opening of the shutter. In the illustrated example where the outputs of the bit-stages 4a and 4b are compared with those of the next three stages, the circuit establishes an over exposure limit value of 3 pulses and a blur limit value, resulting from unsteadiness of a hand-held camera, of 28 pulses. The circuit 11 includes a NAND circuit 12 and a pair of AND circuits 13 and 14. Switches 15 and 16 are provided for adjusting the blur limit value. Thus these switches form an adjusting means for adjusting the limiting value. For example upon closing of the switch 15, the next bit-stage 4f will be connecteed to the AND circuit 13, so that the number of pulses at which the blur limit value is reached is increased, and thus in this way it is possible to shift the blur limit value downwardly by 1 LV. A further shift downwardly can be achieved by closing the switch 16 which will then connect the next bit-stage 4g to the AND circuit 13. Thus with the adjusting means 15, 16 it is possible for the operator of the camera to determine for himself the longest possible exposure time for the hand-held camera.

When the discriminating circuit 11 produces a reset signal the binary counter means 4 is reset and simultaneously opening of the shutter is prevented so that when the reset signal is produced, or in other words when the light intensity is not suitable for a photograph, exposure of film is prevented. Examples of structures for preventing of opening of the shutter include utilizing the reset signal to open the power supply circuit for an electromagnet which is energized in connection with opening of the shutter, or the reset signal may cause current to be supplied to the electromagnet so that the electromagnet will cause an engaging member to engage the shutter release plunger so that the latter is prevented from being depressed to the extent required for opening the shutter. Thus, referring to FIG. 14, it will be noted that there is schematically illustrated therein a shutter-tripping plunger 60 which will trip the shutter when moved downwardly by the operator, as viewed in FIG. 14. For this purpose the plunger 60 carries a projection 62 which will engage and move a shutter-tripping element 64 of the schematically illustrated shutter-opening means 66 when the plunger 60 has been depressed by the operator to an extent sufficient to move element 64 by way of projection 62. However, the reset signal provided from the discriminating means 11 will automatically close a switch 68 to energize the coil 70 of an electromagnet, thus causing the armature 72 thereof to move to the right, as viewed in FIG. 14, in opposition to a spring 74, so that now the armature will be situated beneath the projection 62 preventing the latter from moving down beyond the elevation of the armature 72, and thus actuation of the shutter-opening means 66 will be prevented.

It will furthermore be noted that the plunger 60 carries at its side opposite from the projection 62 a stepped cam 76 having a step 78 which in the initial rest position of the plunger 60 engages, for example, a roller at the left free end of the swingable switch member SW. This member is supported in any suitable way for swinging movement at an intermediate portion as illustrated. Thus, with this construction during the initial downward movement of the plunger 60 the step 78 will swing the switch SW in a counterclockwise direction, as viewed in FIG. 14, so that during the initial increment of the downward movement of the plunger 60 the switch SW engages the contact a, as is apparent from FIG. 14. During the continued downward movement of the plunger 60, the roller at the left of the switch SW engages the vertical edge 80 of the cam 76 so that the switch SW remains in engagement with the contact a. It is only when the upper step 82 of the cam 76 engages the roller of the switch SW that this switch is then turned further away from the contact a into engagement with the contact b, in order to connect the reference pulse generating means to the binary counter means as described above. The positions of the step 82 and projection 62 with respect to each other along the plunger 60 are such that when the step 82 has turned the switch SW through an angle sufficient to engage the contact b, the projection 62 has engaged and moved the element 64 sufficiently to trip the shutter, so that opening of the shutter takes place simultaneously with engaging of contact b by the switch SW.

In addition, when the roller at the left of the switch SW is approximately midway along the vertical edge 80 between the steps 78 and 82, a lower step 84 of the cam 76 engages and swings a lever 86 in a counter-clockwise direction, for the purpose of closing a switch 49 which causes the inverting means 6 to operate for inverting the outputs of the bit-stages of the binary counter means 4 as described above. Thus, this inverting of these outputs will take place after the counting of the pulses from the light-responsive means 1 has been completed and before the switch SW has come into engagement with the contact b and of course before the shutter-opening means 66 is actuated to open the shutter. The switch 49 is referred to below in connection with FIG. 12 which shows one possible single-pulse generator which forms the inverting means 6.

Returning now to FIG. 3, this embodiment operates as follows:

It is assumed that in the initial stage the binary counter means 4 is reset so that the outputs of the several bit-stages thereof is 0. When the user depresses the shutter-tripping plunger 60, with the camera of course directed toward the object which is to be photographed, then during the initial increment of downward movement of the plunger 60 the pulse-generating circuit 1 operates so that a number of pulses inversely proportional to light brightness at the object to be photographed is applied to the binary counter means 4 through the switch SW and the frequency divider circuit 3. In this example the arrangement is such that when there is too much light for a proper photograph 1–3 pulses will be transmitted to the binary counter means 4 from the pulse-generating means 1. It is to be noted that the number of pulses applied to the binary counter means 4 when the brightness of the light is too great for a proper photograph is determined with respect to the number of bit-stages which apply their outputs to the NAND circuit 12. In the illustrated example there are two bit-stages, namely 4a and 4b, connected to the NAND circuit 12, so that the pulse range is 1–3. When the number of pulses received by the binary counter means 4 from the light-responsive pulse generating means 1 is 1, 2 or 3, then the output of the bit-stages 4a and 4b is 01, 10, or 11, respectively. Accordingly, when the output of these two stages is 01 or 10, the NAND circuit will provide an output 1, and when the output of the bit-stages 4a and 4b is 11, the NAND circuit 12 will provide an output 0. At this time the output of the subsequent bit-stages 4c, 4d and 4e is 0, so that the output of AND circuit 13 is 0. Accordingly, the discriminating circuit 11 will not at this time produce a reset signal.

During the intermediate portion of the movement of the shutter-tripping plunger, the single pulse generating circuit 6 operates as an inverting means, in the manner described above, so that its output inverts the output of each of the bit-stages of the binary counter means 4. Thus, in the bit-stages 4a and 4b, the outputs 01, 10 or 11 is inverted into 10, 01 or 00, so that now the NAND circuit will produce an output 1. On the other hand, the output 0 of the several bit-stages 4c, 4d and 4e has been inverted into an output 1, so that the AND circuit 13 will produce an output 1. Therefore, the AND circuit 14 produces an output 1, which functions as a reset signal to reset the binary counter means 4 and will at the same time prevent the shutter from being released, as described above. Thus, when the light intensity is so high that a proper photograph cannot be made with the shortest exposure time which the camera can provide, the number of light-response pulses applied as an input to the binary counter means 4 is below the over exposure limiting value and the shutter is not opened so that an exposure will not be made. In addition, the rest signal may be transmitted to a gate of a switching circuit in order to actuate with its output an indicating lamp which when illuminated informs the operator that the light intensity is improperly high.

Assuming that the embodiment of FIG. 3 is used under conditions where the light intensity is suitable for making proper photograph, then the operation is as follows:

During the first portion of movement of the shutter-releasing plunger, the light-responsive pulse generating means 1 operates so that object brightness response pulses are applied to the binary counter means 4. If it is assumed, for example, that 5 pulses have been applied to the binary counter means 4, then the output of each of the bit-stages 4b, 4d and 4e is 0 while the output of each of the bit-stages 4a, and 4c is 1. This corresponds to a five-bit binary number 00101. When the discriminating circuit 11 receives this output, the output of the NAND circuit 12 is 1, while the output of the AND circuit 13 is 0, so that no reset signal will be produced as an output.

During the second or intermediate stage of movement of the shutter-tripping plunger, the single pulse generating circuit operates to invert the output of each bit-stage of the binary counter means 4. Thus, the output of the bit-stages 4a and 4c becomes 0 and the output of each of the bit-stages 4b, 4d and 4e becomes 1. This corresponds to a five-bit binary number 11010. In this case the output of NAND circuit 12 is 1 while the output of AND circuit 13 is 0, so that after the inverting means operates there still will be no reset signal produced by the discriminating circuit means 11.

During the third and final increment of movement of the shutter-tripping plunger the switch SW is changed over so as to engage the contact b, so that upon opening of the shutter reference pulses of a constant period will be applied from the reference pulse generating means or oscillator 2 to the binary counter means 4. When five of these reference pulses have been transmitted to the binary counter 4, the output of each bit-stage of the binary counter means 4 becomes 1, so that an output is produced by the AND circuit 5a, which renders SCR 9 conductive, so that in this way the exposure terminating means operates to energize the electromagnet 10 which will bring about closing of the shutter in a known way. Thus, assuming that the light brightness is suitable for a proper photograph, the structure will function to make an exposure.

In the event that the light intensity is so low that a proper exposure cannot be made with a hand-held camera, then the operation is as follows:

This condition corresponds to the case where the number of object brightness response pulses transmitted to the binary counter means 4 is greater than 28. At this time during the first stage of movement of the shutter-release plunger, the object brightness response pulses are applied to the binary counter means 4. When the number of these pulses which has been applied to the binary counter means reaches 28, the output of each of the bit-stages 4a and 4b is 0, and the output of each of the bit-stages 4c, 4d and 4e is 1. Accordingly, an output 1 is produced from both the NAND circuit 12 and the AND circuit 13, so that a reset signal is produced even before the outputs of the several bit-stages are inverted, and the binary counter means 4 is thus reset while at the same time the shutter is prevented from being opened as described above. Thus, when the light intensity is so small that blurring of the photographed image resulting from unsteadiness of a hand-held camera will result, the shutter will not be opened and an exposure will not be made. In the same way as in case of an improperly great light intensity, the arrangement may be such that the reset signal will cause an indicating lamp to become illuminated so that the operator will know that the light intensity is too low for a proper photograph.

Therefore, with this particular example exposure of the film will not be carried out when the photographing light intensity is either so great that even with the smallest exposure time over exposure will result or so low that blurring will result, and an exposure can only be made with a proper light intensity.

In addition, as pointed out above, it is possible to adjust the hand-steadiness limit according to the skill of the operator by utilizing the switches 15 and 16. Thus where the switch 15 is closed, the hand-unsteadiness blur limit value can be shifted down by 1 LV, and when both of the switches 15 and 16 are closed, the shift-down value can be to the extent of 2 LV. While in the illustrated example three bit-stages 4c, 4d and 4e are normally connected to the AND circuit 13, in practice some five bit-stages will be connected to this AND circuit, since usually the proper shutter speed range is 1/1000–1/60.

In the above-described example of FIG. 3, exposure of film will be carried out only when the light intensity is such that a proper photograph will be made. If it is desired to make an exposure with improper lighting conditions, then through suitable switches the entire discriminating circuit 11 can be disconnected from the binary counter means 4. Alternatively, the arrangement made is such that the reset signal is used not for resetting the binary counter means 4 and preventing the shutter from being opened, but only for indicating, as by illumination of a suitable lamp, that an improper lighting condition exists.

If it is desired to prevent the shutter from being opened only when there is too much light, while it is intended to make an exposure when the brightness of the light is too small for a hand-held camera, as, for example, when it is desired to make a photograph with the camera mounted on a tripod, then, for example, a switch may be inserted next to the AND circuit 14 and the arrangement may be such that this switch will remain open while the binary counter means 4 counts the pulses from the light-responsive pulse generating means 1 and is closed simultaneously with or immediately after operation of the inverting means 6.

In the reverse case, which is to say if it is desired to make an exposure with an improperly high brightness, while the shutter is prevented from being opened with an improperly low brightness, then, for example, the arrangement may be such that a switch is inserted next to the AND circuit 14 and is first maintained closed and then opened immediately before inverting of the outputs of the bit-stages of the binary counter means 4. In this case, when the bit-stage corresponding to the blur limit operates with a pulse received from the previous bit-stage during counting of pulses from the means 1, which is to say when this particular limiting bit-stage produces an output 1, this output may itself be utilized as a reset signal and then the discriminating circuit 11 becomes unnecessary. With such a construction the arrangement may be such that with, for example, a rotary switch an arbitrary bit-stage is selected as the blur limit bit-stage which when its output is changed to 1 indicates that with a hand-held camera it is not possible to make an unblurred photograph, so that it becomes possible in this way to adjust the longest exposure time for a hand-held camera according to the skill of a given operator.

Figure 4:
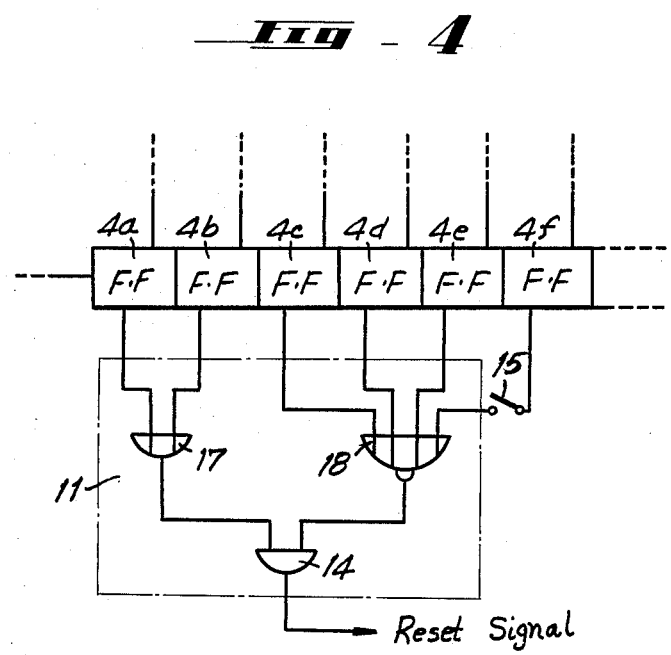
FIG. 4 shows another type of structure for preventing exposure under improper photographing conditions.

FIG. 4 illustrates a further example of a discriminating circuit 11 which has the same function as the discriminating circuit 11 of FIG. 3. In the example of FIG. 3 the input from each bit-stage to the NAND circuit 12 and the AND circuit 13 in the discriminating circuit 11 is 0 in the reset state and 1 when an output is produced from each bit-stage. If the arrangement is to be made in such a way that each bit-stage has an output 1 in the reset state and 0 when it produces an output then, as shown in FIG. 4, an OR circuit 17 instead of NAND circuit 12 and a NOR circuit 18 instead of the AND circuit 13 are utilized, so that precisely the same function is achieved with the embodiment of FIG. 4 as with the embodiment of FIG. 3 under these conditions. Thus, with respect to such problems as what particular circuit is to be utilized to form the discriminating circuit 11 and the coincidence detecting circuit 5 or where the positive or negative logic is to be introduced with respect to the output, selection can be freely made in the design of the structure of the invention.

FIG. 5 illustrates an example of the present invention according to which when the photographic light intensity is so high that even with the smallest possible exposure time there will still be an overexposure, a warning indication is provided to indicate this condition and at the same time the diaphragm aperture is automatically stopped down by a certain value. Referring now to FIG. 5, the shutter-closing circuit 19 is made up, for example, as mentioned above in FIG. 3, of an SCR 9 and electromagnet 10. This particular embodiment is constructed in such a way that when the photographic light intensity is improperly high, three or a lesser number of light-response pulses are received by the binary counter means 4 as an input, which is to say the overexposure limit value is 3. A coincidence detecting circuit 20 is provided in order to discriminate whether the photographic light intensity memorized by the binary counter means 4 is improperly high or not. If the light intensity is improperly high, then no light response pulse will be received by 3, bit-stage 4c or the subsequent bit-stages, so that the outputs of bit-stage 4c and the subsequent bit-stages will all be the same. This coincidence of outputs of these bit-stages is utilized for discrimination purposes. For the coincidence detecting circuit 20 it is possible to utilize, in the same manner as the coincidence detecting circuit 5 an AND, an OR circuit, a NOR circuit, a NAND circuit, an exclusive OR circuit, etc. An indication circuit 21 responds to a signal received from the coincidence detecting circuit 20 in order to emit light and thus provide a warning to the operator that there is too much light for a proper exposure with the smallest exposure time. This indicating means 21 may include, for example, a switching circuit and a light emission diode or a lamp which is controlled by the on-off action of the switching circuit. Furthermore, the coincidence detecting circuit 20 is connected with a diaphragm driving circuit 22 operatively connected with the diaphragm 23 for stopping the latter down by a given value in response to a signal from the coincidence detecting circuit 20. For example the diaphragm driving circuit 20 may include a servo-motor circuit.

The operation of the embodiment of FIG. 5 is as follows:

It is assumed for purposes of illustration that the coincidence detecting circuits 5 and 20 are in the form of AND circuits while the initial or reset state of the binary counter means 4 is one where the several bit-stages thereof provide an output 0. When the shutter-tripping plunger is depressed, then, for example, during the initial part of the movement thereof, the light-responsive pulse generating means 1 operates so that a number of pulses inversely proportional to light brightness at the object to be photographed is applied to the binary counter means 4 through the switch SW in the position thereof shown in FIG. 5 and the frequency divider circuit 3. Assuming now that the light intensity is too high and that only two pulses have been applied to the binary counter means 4, then under these conditions the output of bit-stage 4b is 1 and the output of each of the bit-stage 4a, 4c, 4d, . . . 4n is 0. Therefore, each of the inputs to the coincidence detecting circuit 20 is 0 so that no output is produced. Accordingly, the indicating circuit 21 emits no light and the diaphragm driving circuit does not operate.

However, during the second or intermediate portion of the movement of the shutter-tripping plunger the inverting means 6 operates so as to invert the outputs of the several bit-stages of the binary counter means 4. Thus, the output 1 of bit-stage 4b is inverted into 0, while the several outputs 0 of the remaining bit-stages are inverted into 1. Accordingly, all of the inputs to the coincidence detecting circuit 20 are 1, so that an output signal is produced, and this signal will cause the indicating means 21 to emit light so as to warn the operator that the photographic light intensity is improperly high, and at the same time the diaphragm driving circuit 22 is operated so as to stop the diaphragm 23 down by a predetermined increment. The operator, upon being warned in this way by the indicating means 21, will not continue to depress the shutter-tripping plunger until the shutter opens but instead will release the shutter-tripping plunger so that it returns to its initial position. This returning action will cause the binary counter means 4 and the indicating circuit means 21 to be reset.

Now the operator will again depress the shutter-tripping plunger, and the above-mentioned memorizing and inverting actions at the binary counter means 4 will take place while the above discriminating action of the coincidence detecting circuit 20 is also carried out. However, at this time the diaphragm 23 has been stopped down automatically as set forth above, so that the light intensity has been reduced, and assuming that the light intensity is now in a range which is suitable for a proper photograph, then the operations will continue and an exposure will be made. Of course, if even after this stopping down of the diaphragm there is still too much light the indicating means 21 will again emit light and the above operations will be repeated with the diaphragm again being stopped down automatically so that during the next depression of the shutter-tripping plunger the operations are carried out with even less light travelling through the objective.

In the event that the light intensity is such that a proper photograph will be made or that a proper photographing light intensity has been obtained by the above operations, then four or more light response pulses will be applied as an input to the binary counter means 4 from the light-responsive pulse generating means 1. For example, if five pulses are applied as in input, then the output of each of the bit-stages 4a and 4c is 1 while the output of each of the remaining bit-stages is 0. Accordingly, the inputs to the coincidence detecting circuit 20 do not coincide with each other both before and after inversion of the binary counter means 4. Therefore, the coincidence detecting circuit 20 will not produce a signal so that the indicating means 21 does not emit light and the diaphragm driving circuit 22 does not operate.

When the operator has confirmed that during the second or intermediate stage or increment of movement of the shutter-tripping plunger, after inversion of the binary counter means 4, the indicating means 21 does not emit light, he continues to depress the shutter-tripping plunger through its third or last stage of movement. Now the change-over switch SW will be turned so as to engage the b contact and in synchronism with opening of the shutter reference pulses are counted by the binary counter means 4, these reference pulses being provided by way of the oscillator 2 as described above. When five such reference pulses have been applied as an input to the binary counter means 4, the output of each of the bit-stages of the binary counter means 4 is 1, so that the coincidence detecting circuit 5 will act as the exposure-terminating means to provide a shutter-closing signal as an output.

Therefore, with this particular example if the photographing light intensity is so high that even with the smallest exposure time which the camera can provide there would still be an overexposure, during the second or intermediate stage of movement of the shutter-tripping plunger the indicating circuit 21 will emit light to give a warning to the operator and at the same time the diaphragm is automatically stopped down by a certain value. Therefore, the user can obtain a proper photographing light intensity by permitting the shutter-tripping plunger to return to its initial position and then depressing it again. Therefore, as long as the operator confirms that the indicating means 21 does not emit light and continues to depress the shutter-tripping plunger all the way through its last stage of movement, a proper exposure will be made with a proper exposure time.

Referring now to FIG. 6, there is illustrated therein an embodiment of the present invention according to which when the photographing light intensity is so low that the exposure time will be so long that unsteadiness of the camera will result in blurring of the photographed image, referred to below as a condition of improperly low brightness, then a warning indication is provided to indicate that this condition of improperly low brightness exists and at the same time the diaphragm is automatically opened to an aperture which is wider by a given increment, so that during the next operation of the shutter-tripping plunger it is possible to make an exposure with a larger amount of light. However, a limiting depth of field value can be determined for limiting the extent to which the diaphragm will be opened when the largest opening for the desired depth of field is achieved, and under these conditions the diaphragm cannot be further opened even if a condition of improperly low brightness exists.

In the particular example illustrated it is assumed that when the photographing light intensity is so low that the exposure time will be 1/30 second or longer 16 or more light response pulses will be applied as an input to the binary counter means 4. Therefore, in the particular example, the hand-shaking blur limit value is 16. Thus, when the photographing light intensity is such that no blurring of the photographed image will result from unsteadiness of a hand-held camera, which is to say if the brightness is proper or even very high, then light response pulses will not be received as an input to the bit-stage 4e or the subsequent bit-stages.

The embodiment of FIG. 6 includes a detecting circuit 24 which is capable of discriminating as to whether the photographing light intensity memorized by the binary counter means 4 is of an improperly low brightness or not. This discriminating action is made utilizing the fact that when the photographing light intensity is of an improperly low brightness the light response pulses are received by the bit-stage 4e and the subsequent bit-stages. When no light-response pulses are applied as an input to the bit-stage 4e and the subsequent bit-stages, then the resulting output changes from that of the initial condition, so that for the circuit 24 a circuit is utilized which is capable of detecting such a change. In practice, in the same manner as the coincidence detecting circuit 20 of FIG. 5, utilization is made of an AND circuit, a NAND circuit, and OR circuit, a NOR circuit, an exclusive OR, etc. With an exclusive OR circuit, however, allowance must be made of the fact that the discrimination cannot be made between the cases where each input is 0 and each input is 1.

In the embodiment of FIG. 6 a gate circuit 25 is provided for operating in such a way that after inversion of the binary counter means 4, the output of the detecting circuit 24 is applied to the indicating means or circuit 26 and to the diaphragm driving circuit 27, as described below. For the circuit 25, for example, an AND circuit or other circuit may be utilized. A bistable circuit 28 such as an F.F. receives inverting pulses from the single pulse generating circuit or inverting means 6. This bistable circuit 28 operates upon receiving such a single pulse from the circuit 6, and the output of the detecting circuit 24 is capable of passing through the gate circuit 25 only when an output of the bistable circuit 28 is applied to one input terminal of the gate circuit 25.

The indicating or warning means 26 may be of the same construction as the indicating or warning means 21 of FIG. 5. Also the diaphragm driving circuit 27 may be of the same construction as the diaphragm driving circuit 22 of FIG. 5. However, in the embodiment of FIG. 6 there is a signal circuit 29 for detecting whether the diaphragm aperture has reached the limit for the desired depth of field or not. A practical example of signal circuit 29 is described below in connection with FIG. 7. The embodiment of FIG. 6 further includes an indicating circuit 30 of the same construction as the circuits 21 and 26, the circuit 30 being arranged in such a way that it will emit light upon receiving an output from the signal circuit 29.

The operation of the embodiment of FIG. 6 is as follows:

It is assumed that the detecting circuit 24 is a NAND circuit while in its initial reset state the binary counter means 4 has an output 0 at each of its bit-stages.

When the shutter-tripping plunger is depressed and the light intensity is not of an improperly low brightness, then during the first portion of movement of the shutter-tripping plunger the light-responsive pulse generating means operates so that light response pulses are applied to the binary counter means 4. Inasmuch as the photographing light intensity is not of an improperly low brightness, the number of light response pulses will be less than 16. Therefore, light response pulses will not be applied as an input to the bit-stage 4e and the subsequent bit-stages. Accordingly, the output of each of the bit stages 4e, 4f, . . . 4n is 0. There 0 outputs are applied as an input to the NAND circuit 24 which acts as a detecting circuit so that under these conditions the circuit 24 produces an output 1. This 1 output is, however, blocked by the action of the gate circuit 25 and is not sent to the indicating circuit 26 and the diaphragm driving circuit 27.

During the next intermediate portion of the movement of the shutter-tripping plunger, the inverting means 6 operates so that a single pulse a transmitted to the binary counter means 4 and the bistable circuit 28. Then the output of each of the bit-stages of the binary counter 4 is inverted, and the bistable circuit 28 operates to apply its output to the gate circuit 25. Inasmuch as the 0 output of each of the bit-stages 4e, 4f, . . . 4n, has been inverted into 1, the NAND circuit produces no output, and since at this time the NAND circuit has no output even if the gate circuit 25 is open, the indicating circuit 26 will not emit any light and the diaphragm driving circuit 27 does not operate.

Under the above conditions when the shutter-tripping plunger is further depressed through its last stage of movement, the change-over switch SW will move away from the *a* contact into engagement with the *b* contact, so that in synchronism with opening of the shutter reference pulses are transmitted to the binary counter means 4. When the number of reference pulses counted is equal to the number of memorized light-response pulses, the shutter-closing signal is produced as an output from the exposure-terminating means 5 in the manner described above.

Assuming now that the embodiment of FIG. 6 is operated under conditions where the photographing light intensity is of an improperly low brightness, then the operation is as follows:

Upon depressing the shutter-tripping plunger, 16 or more light-response pulses are applied to the binary counter means 4. Assuming that 16 pulses have been applied as an input, then the bit-stage 4e has an output 1, while each of the other bit-stages has an output 0. Accordingly, the output of NAND circuit 24 is 1. However, since the gate circuit 25 is closed, the indicating means 26 will not emit light.

During the continued movement of the shutter-tripping plunger through its second or intermediate stage of movement, the single-pulse generating circuit 6 operates so that the outputs of the several bit-stages are inverted, as described above, and at the same time the bistable circuit 28 is operated so as to open the gate circuit 25. Inasmuch as in the binary counter means 4 the bit-stage 4e has its output inverted from 1 to 0 while each of the remaining bit-stages have their outputs inverted from 0 to 1, the NAND circuit 24 produces an output which passes through the gate circuit 25 and causes the indicating means 26 to emit light, while at the same time the diaphragm driving circuit 27 operates so as to further open the diaphragm 23 by a given increment. The light emission of the indicating circuit 26 warns the operator that the photographing light intensity is of such an improperly low brightness that unsteadiness of the camera will resuslt in blurring of the photograph, so that the operator will not complete the depression of the shutter-tripping plunger and will not open the shutter. Instead the operator will permit the shutter-tripping plunger to return to its initial position, and this returning action will reset the binary counter means 4, the indicating circuit 26, the bistable circuit 28 and all the other devices.

Now, when the shutter-tripping plunger is again depressed, the memorizing and inverting operations take place at the binary counter means 4 and the discriminating action of the detecting circuit 24 is carried out. However, at this time the diaphragm 23 has been opened automatically to a larger aperture so that the photographing light intensity is greater. Assuming that under these conditions the photographing light intensity is not of an improperly low brightness, then the indicating circuit 26 will not emit light when the shutter-tripping plunger is depressed through the intermediate stage of its movement, so that when the user depresses the shutter-tripping plunger through the last stage of its movement the shutter is tripped and an exposure is made as described above.

If, in this example the diaphragm 23 has been automaticallly opened to the limiting value for a given depth of field, then the signal circuit 29 will automatically respond to provide an output and will cause the indicating circuit 30 to emit light so as to inform the operator that the largest aperture for the desired depth of field has been reached. At the same time, the output from the signal circuit 29 is applied to the diaphragm driving circuit 27 so as to render the latter inoperative. The operator will first permit the shutter-tripping plunger to be returned to its initial position and will then depress it again. Then, with the diaphragm opened to the largest aperture for the predetermined depth of field, the memorizing and inverting actions of the binary counter means 4 will take place in the discriminating action of a detecting circuit 24 are carried out.

If at this limiting value of opening of the diaphragm there is still an improperly low brightness, then the output from the detecting circuit 24 will cause the indicating means 26 to emit light. At this time, however, the diaphragm driving circuit 27 has been prevented from operating as a result of the signal from the circuit 29, so that the diaphragm 23 is not further opened.

Under these conditions when the shutter release plunger is depressed through the last stage of its movement, the photographing operation is carried out in the above manner. At this time, since the light emission of the indicating circuit 26 has already informed the operator that the exposure time is such that a blurred image will be photographed as a result of unsteadiness of the hand-held camera, the operator can take steps such as mounting the camera on a tripod, etc., so as to enable a proper photograph to be taken under these conditions.

As pointed out above, according to the present invention when the photographing light intensity is of such a low brightness that the exposure requires an extremely long exposure time which may result in blurring from lack of steadiness, in the second or intermediate stage of movement of the shutter-tripping plunger the indicating circuit 26 will emit light to warn the user and the diaphragm will automatically be opened by a given increment, so that the operator can obtain a proper photograph with increased light intensity by returning the shutter release plunger to its initial position and depressing it again.

If in the process of the automatic opening of the diaphragm as set forth above the diaphragm reaches the tolerable limit value where the limiting depth of field will be provided, then an indication is made to this effect and the diaphragm is prevented from being further opened. Thus, with this arrangement the depth of field is prevented from becoming shallower than the operator expects.

Moreover, the operator can determine for himself the longest exposure time at which the camera can be maintained steady, according to his own skillfulness, by connecting the bit-stage 4e to the detecting circuit 24 through a suitable switch (not shown) and opening this switch.

Figure 7:
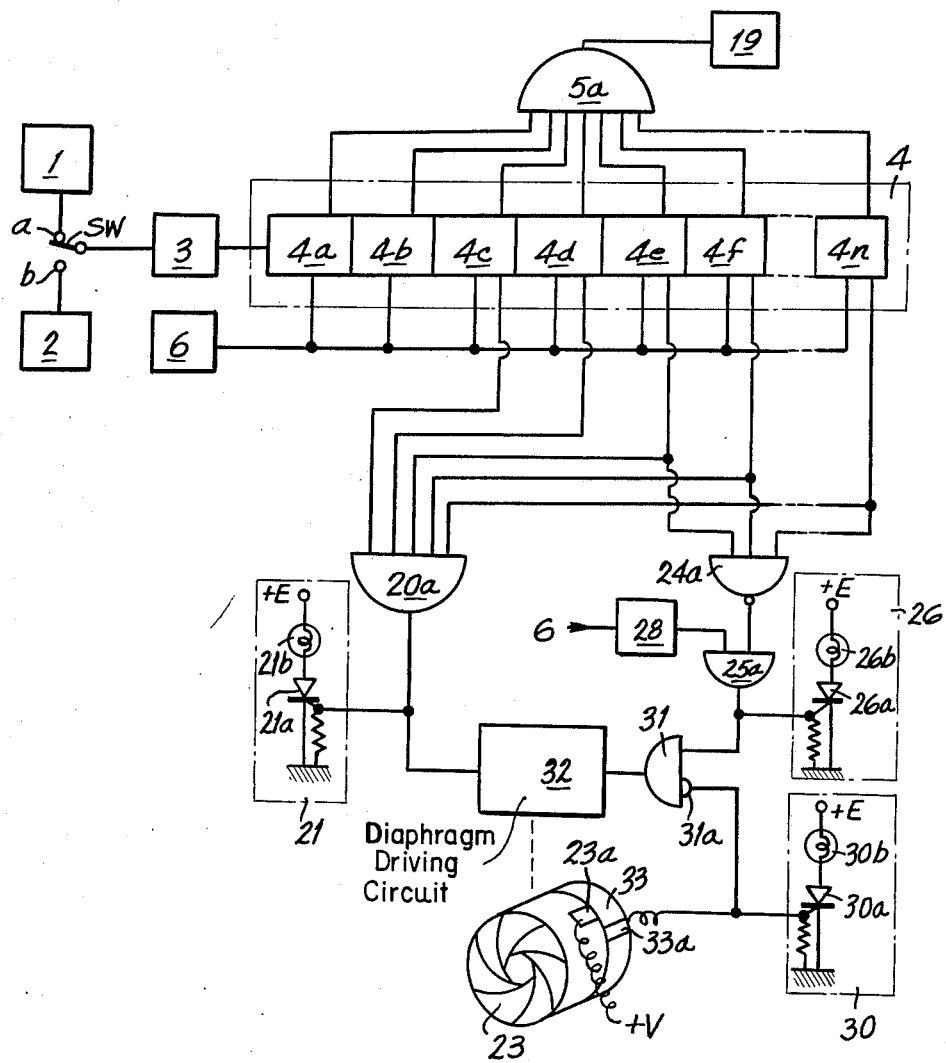
FIG. 7 shows in greater detail a construction which combines the features of FIGS. 5 and 6 and which is capable of achieving the results achieved by the structures of both FIGS. 5 and 6.

FIG. 7 illustrates an embodiment of the invention which combines the functions of FIGS. 5 and 6. In FIG. 7 there is illustrated an AND circuit 20a which acts as a coincidence detecting circuit for discriminating whether or not the photographing light intensity is of an improperly high brightness, while an SCR 21a acts as a switch connected to the AND circuit 20a, the SCR 21a being connected to a warning lamp 21b which becomes illuminated in order to indicate an improperly high brightness. The circuit also includes a NAND circuit 24a acting as a coincidence detecting circuit for discriminating whether the photographing light intensity is of an improperly low brightness or not, and this latter circuit 24a is connected with an AND circuit 25a acting as a gate circuit, the latter being connected to an SCR 26a functioning as a switch element for controlling a warning lamp 26b which will become illuminated under conditions of improperly low brightness.

In FIG. 7 it is assumed that the overexposure limit value is 3 pulses while the hand-shaking blur limit value is 16 pulses. These values, however, may be determined as required. In practice, the proper shutter speed range is 1/1000–1/60 second, so that 5 bits (5 stages) may be provided between these two limiting values of exposure time.

The embodiment of FIG. 7 includes an inhibiting circuit 31 which acts as a gate circuit, this circuit being inserted in the path through which the output of the detecting circuit 24a passes through the diaphragm driving circuit 32 after having passed through the gate circuit 25a. The circuit 31 is arranged so that when the tolerable limit value signal corresponding to the shallowest depth of field is applied to the NOT terminal 31a the gate is closed. FIG. 7 further illustrates an SCR 30a acting as a switching element for receiving a signal corresponding to the tolerable limit-value of the depth of field which will be produced by the largest desired aperture, and this signal will reach a warning lamp 30b through the switching element 30a. In addition, a diaphragm driving circuit 32 which is connected to the diaphragm driving ring 23 for driving the latter is provided, this diaphragm driving circuit 32 containing the diaphragm driving circuits 22 and 27 of FIGS. 5 and 6, respectively. At the diaphragm there is a contact member 23a which is fixed to the diaphragm ring 23 and is connected to a current source plus V, while an adjustable preset ring 33 carries a contact 33a which is fixed to this preset ring and situated in the path of movement of the contact 23a. Thus, the ring 33 may be set for predetermining the largest aperture which is desired, and when the diaphragm driving circuit 32 has caused the ring 23 to rotate through such an angle that the contact 23a engages the contact 33a, a tolerable limit-value signal is produced.

With the embodiment of FIG. 7 when the photographing light intensity is of an improperly high brightness, then upon inversion of the binary counter means 4 the AND circuit 20a produces a signal so that the indicating lamp 21b becomes illuminated and the diaphragm driving circuit 32 operates so as to rotate the diaphragm ring 23 through a given angle so that diaphragm is automatically stopped down under these conditions. When the photographing light intensity is of an improperly low brightness, then upon inversion of the binary counter means 4, the NAND circuit 24a produces a signal output. The latter signal passes through the gate 25a which has been opened by receiving an inverting pulse, as described above in connection with FIG. 6, and thus the lamp 26b will become illuminated to provide a warning that the condition of improperly low brightness exists, while at the same time the signal will pass through the gate circuit 31 and operate the diaphragm driving circuit 32 so as to further open the diaphragm. If such opening of the diaphragm ring 23 results in reaching the tolerable limit according to the desired depth of field, then the contact member 23a and 33a will engage each other, and a corresponding signal will cause lamp 30b to become illuminated, and this signal is also applied to the NOT terminal 31a of the gate circuit 31 so that the gate is closed. Accordingly, when the operator permits the shutter-tripping plunger to return to its initial position and then depresses it again, so that the detecting circuit 24a produces a signal, this signal cannot operate the driving circuit 32 so that the diaphragm is not further opened.

Figure 8:
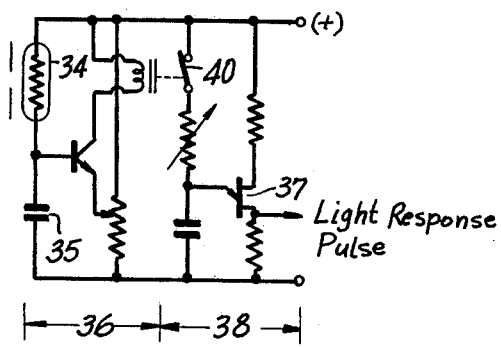
FIG. 8 illustrates a circuit for generating a number of pulses inversely proportional to light brightness.
Figure 9:
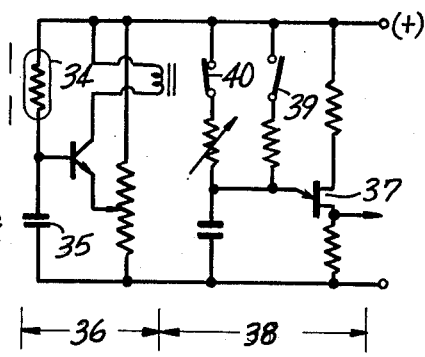
FIGS. 9 and 10 illustrate circuits not only for providing a number of pulses inversely proportional to light brightness but also for producing reference pulses.
Figure 10:
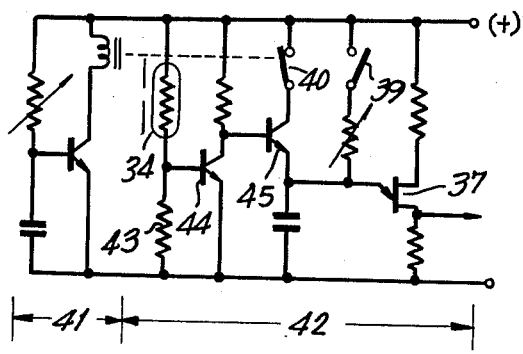

FIGS. 8–10 illustrate practical examples of the light-responsive pulse-generating means 1.

Referring to FIG. 8, the circuitry illustrated therein includes a timer circuit 36 having a timing circuit made up of a light-responsive element 34, which may be a cadmium sulfide element, and a capacitor 35 connected in series therewith. This circuitry is connected to a pulse oscillating circuit 38 which has a unijunction transistor 37. This circuitry will thus generate pulses having a number which is inversely proportional to the brightness of the light.

FIG. 9 shows an embodiment where the pulse oscillating circuit 38 also serves to provide the reference pulses of the reference pulse oscillator 2, so that this circuit also includes the reference pulse generating means 2. When light-responsive pulses are to be produced, the switch 39 is in an open position so that the circuit of FIG. 9 will then operate in the same way as the circuit of FIG. 8, while when the circuit of FIG. 9 operates as the reference pulse generating means 2, the switch 39 is closed and at the same time the switch 40 is opened, these switches forming part of a relay as illustrated.

In the example of FIG. 10 the timer circuit 41 is a conventional timer circuit which is independent of object brightness while the oscillation frequency of the pulse oscillator 42 is inversely proportional to object brightness. In this pulse oscillator 42 the arrangement is such that a voltage determined by the cadmium sulfide element 34 and resistor 43 in series therewith is applied through a transistor 44 to a transistor 45, and by varying the internal resistance of the transistor 45 the oscillation frequency of the pulse oscillator which has a unijunction transistor 37 is varied. the same way as with the pulse oscillator 38 of FIG. 9, the pulse oscillator 42 serves also as a reference pulse generating means 2 by closing of the switch 39 and opening of the switch 40.

In the above examples of FIGS. 8–10, the illustrated variable resistors in the timer circuit or the pulse oscillating circuit can be adjusted for controlling exposure factors such as film sensitivity. When it is desired to use a reference pulse oscillator 2 which is not of a combined type as shown in FIGS. 9 and 10 but of a separate type, then any well known pulse oscillator may be utilized.

Figure 11:
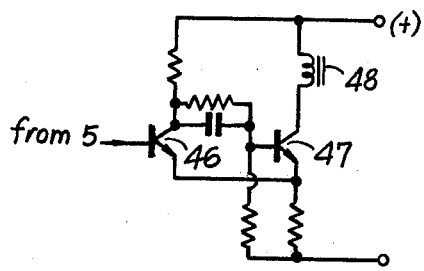
FIG. 11 illustrates the details of an exposure-terminating circuit.

FIG. 11 shows a further example of the shutter-closing circuit 19. In FIG. 11 the circuit includes transistors 46 and 47 which form a Schmidt circuit and a shutter-closing electromagnet 48 inserted in the collector circuit of transistor 47. In this Schmidt circuit, first the second-stage transistor 47 is ON so that electromagnet 48 is initially excited to prevent the shutter-closing curtain from being released and terminating the exposure. When a shutter closing signal is applied as an input to the first-stage transistor 46, this Schmidt circuit is inverted so that the transistor 47 turns OFF, and now the energizing of the electromagnet 48 is terminated so that the trailing shutter curtain is released to close the shutter in a well known manner.

Figure 12:
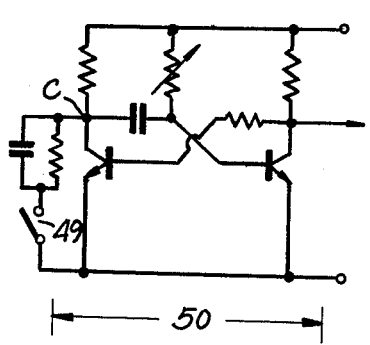
FIG. 12 illustrates the details of one possible circuit for inverting the number of pulses counted by the binary counter.

FIG. 12 illustrates one possible example of a single pulse generating circuit 6 which forms the inverting means as described above. For example, during the second or intermediate stage of movement of the shutter-tripping plunger the switch 49 is closed, as described above in connection with FIG. 14, so that a pulse will be produced at the junction C. From this pulse an inverting pulse is produced as an output from a monostable multivibrator 50. It is also possible to utilize for the single pulse generating circuit any other circuit which can invert the binary counter.

FIG. 13 illustrates one possible practical example of the diaphragm driving circuit 32 of FIG. 7. In the example of FIG. 13 monostable multivibrators 52a and 51b receive detecting signals from the detecting circuits 20a and 24a, respectively, and produce square waves as an output, as illustrated. AND circuits 52a and 52b serve as gate circuits for permitting pulses to pass from a pulse oscillating circuit 53 for the time duration of the pulse widths of the square waves of the monostable multivibrators 51a and 51b, respectively. The circuit elements from the transistor 54a to capacitor 55a constitute a pulse accumulating circuit in which the number of pulses which have passed through the gate circuit 52a is accumulated in the capacitor 55a as a voltage value. The same is true with the circuit elements from the transistor 54b to the capacitor 55b.

Transistors 56a and 56b constitute a differential amplifier so that the potential difference between the junction m and n causes a motor 57 to rotate. Variable resistors 58a and 58b are arranged in such a way as to be in driving connection with the rotating motor 57.

With this construction when a detection signal from the detecting circuit 20a is applied to the monostable multivibrator 51a, a certain number of pulses pass through the gate circuit 52a and are accumulated in the capacitor 55a as a voltage value. Accordingly a potential difference is produced between the junctions m and n so that the motor 57 will rotate. In driving connection with the rotating motor 57 is the sliding contact of the variable resistor 58b which now moves upwardly as viewed in FIG. 13, so that the source voltage E charges the capacitor 55b. When the voltage of the capacitor 55b becomes equal to the voltage of the capacitor 55a, the potential difference between the junctions m and n becomes zero and the motor 57 is stopped. Thus, when a detecting signal is applied as an input to the multivibrator 51a, the diaphragm will be stopped down by a certain value. On the other hand, when a detection signal is applied as an input to the monostable multivibrator 51b, the diaphragm will be opened by a certain value.

If, instead of a motor 57, a meter such as a well-known rotary magnet or moving coil meter is utilized, the meter will stop at a position which corresponds to the potential difference so that the variable resistors 58a and 58b are not necessary with such a construction. Alternatively, a pulse motor may be utilized instead of the motor 57. Thus, the construction of the diaphragm driving circuit can be freely selected from a number of different designs.

Thus, the present invention has been described in detail above. Insofar as the principles of the present invention are utilized, any changes of design of the details and the circuits and circuit elements may be freely selected. For example, the above-mentioned overexposure and blur limit values are provided only for convenience of description and the particular limiting values may be determined as necessity requires.

As pointed out above, according to the present invention, the brightness of the light at the object which is to be photographed is memorized as a pulse-digital signal and determination of the exposure time is carried out through digital signals so that the determination of the exposure time is extremely accurate. The particular advantage of the present invention resides in the fact that the construction is simpler than alredy known digital-signal electrical shutter controls of this general type.

Furthermore, with the present invention an overexposure limit value and/or a hand-shaking or blur limit value are established, with the number of pulses applied as an input to the binary counter means being compared with such limit values so as to discriminate whether the photographing light intensity is proper or not, and in the event that improper photographing light intensity is detected the exposure of the film is prevented. Thus if there is a danger of overexposure or blurring of the photograph, the shutter is not opened and exposure of the film is not carried out so that even a beginning photographer can be assured of successful camera operation.

Furthermore, with the construction of the present invention after the above discriminating operations have been carried out, in the event of improper photographing light intensity the diaphragm aperture is automatically adjusted so as to compensate for the improper light intensity by a certain value, and thus there is the advantage that once the diaphragm is set it need not be reset manually since it is automatically reset in accordance with the invention.

What is claimed is:

1. In a camera, light-responsive pulse generating means for generating a number of pulses which is inversely proportional to light brightness, reference pulse generating means for generating a series of reference pulses, binary counter means for counting the pulses of both pulse generating means, switch means connected between both pulse generating means and said binary counter means for connecting said light-responsive pulse generatinng means first to said binary counter means so that the latter first counts a number of pulses inversely proportional to light brightness and for then disconnecting said light-responsive pulse generating means from said binary counter means and connecting said reference pulse generating means thereto so that after first counting the number of pulses inversely proportional to light brightness said binary counter means counts a series of reference pulses generated by said reference pulse generating means, inverting means connected to said binary counter means for inverting the number of pulses counted thereby and received from said light-responsive pulse generating means prior to counting reference pulses received from said reference pulse generating means, shutter-opening means for opening a shutter of a camera simultaneously with connecting of said reference pulse generating means to said binary counter means by said switch means so that exposure time starts with transmission of reference pulses to said binary counter means, exposure-terminating means for providing a shutter-closing signal which results in closing of the shutter and terminating an exposure, said exposure-terminating means being connected with said binary counter means for providing said signal when the number of reference pulses counted by said binary counter means equals the number of pulses received by said binary counter means from said light-responsive pulse generating means, and means for preventing opening of the shutter connected with said binary counter means to prevent operation of said shutter-opening means when the number of pulses received by said binary counter means from said light-responsive generating means is beyond at least one end of a given range of pulses.

2. The combination of claim 1 and wherein said means for preventing opening of the shutter responds to a number of pulses smaller than said range.

3. The combination of claim 1 and wherein said means for preventing opening of the shutter responds to a number of pulses greater than said range.

4. The combination of claim 1 and wherein said means for preventing opening of the shutter responds to both a number of pulses smaller than said range and a number of pulses greater than said range.

5. The combination of claim 2 and wherein the camera includes an adjustable diaphragm, and diaphragm-adjusting means operatively connected with the diaphragm for automatically stopping the latter down by a given increment when said number of pulses provided by said light-responsive pulse generating means is smaller than said range and said means for preventing opening of the shutter cooperating with said binary counter means for resetting the same so that immediately after said resetting a second operation of said light-responsive pulse generating means with the camera having its diaphragm stopped down can be carried out to determine whether with the stopped down diaphragm the number of pulses is within said range.

6. The combination of claim 3 and wherein the camera includes a diaphragm, and diaphragm adjusting means for automatically opening the diaphragm by a given increment when shutter-opening is prevented by said means for preventing opening of the shutter, the latter cooperating with said binary counter means for resetting the same so that immediately after shutter opening has been prevented because the number of pulses counted by said binary counter means and received from said light-responsive pulse generating means is greater than said range, a second counting by said binary counter means of pulses from said light-responsive pulse generating means can be carried out with a diaphragm which has a larger opening.

7. The combination of claim 6 and wherein a limiting means is operatively connected with said diaphragm adjusting means for limiting further automatic operation thereof for opening the diaphragm when the diaphragm has been opened to a given extent.

8. The combination of claim 1 and wherein an adjusting means cooperates with said binary counter means and said means for preventing opening of the shutter for adjusting at least one end of said range.

9. The combination of claim 8 and wherein said means for preventing opening of the shutter operates when the number of pulses received from said light-responsive means and counted by said binary counter means is greater than said range, and said adjusting means adjusting the longest exposure time which a given individual can provide to achieve a good photograph with a hand-held camera.

10. The combination of claim 1 and wherein an indicating means cooperates with said binary counter means for indicating when the number of pulses received from said light-responsive pulse generating means and counted by said binary counter means is greater than a given number, so that if said given number corresponds to the longest exposure time available to a given individual for making a photograph with a hand-held camera, the camera can then be placed on a tripod or the like prior to exposure.

11. In a camera, light-responsive means for providing a signal corresponding to light brightness, exposure-time determining means for automatically determining exposure time, said exposure-time determining means being connected with said light-responsive means for determining exposure time when the signal provided by said light-responsive means corresponds to a given range of light brightness, detecting means connected with said exposure-time determining means for detecting when the signal provided by said light-responsive means is beyond at least one end of said range, means connected to said detecting means for preventing opening of a shutter of the camera when said detecting means detects that the singal provided by said light-responsive means is beyond said one end of said range, and diaphragm-adjusting means connected with said detecting means for automatically adjusting a diaphragm of the camera when said detecting means detects that said signal is beyond said one end of said range, so that immediately thereafter exposure operations can be carried out with the automatically adjusted diaphragm.

* * * * *